Oct. 16, 1934.                     W. H. LYMAN                     1,977,072
                                AIRCRAFT PROPELLER
                                Filed Oct. 31, 1933
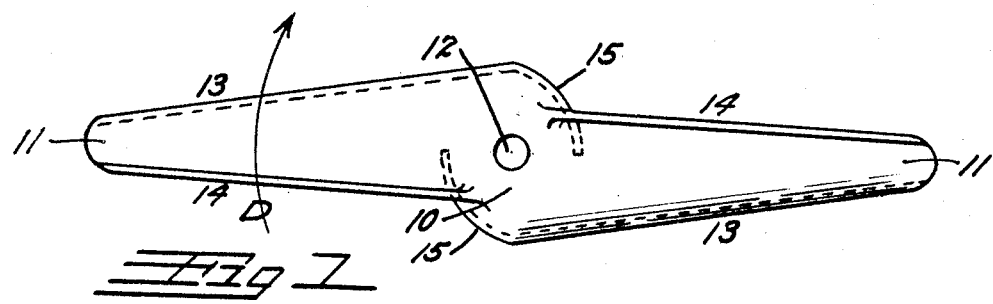
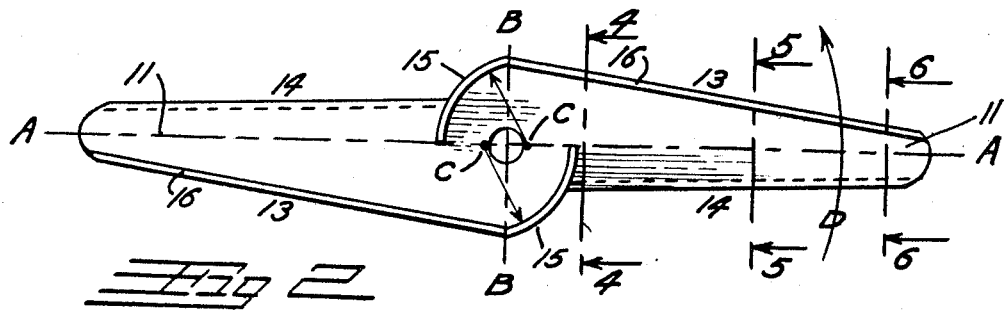
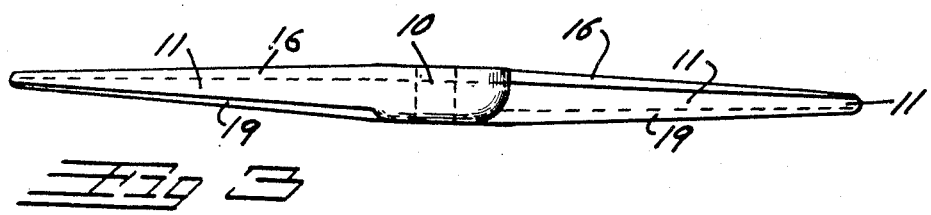
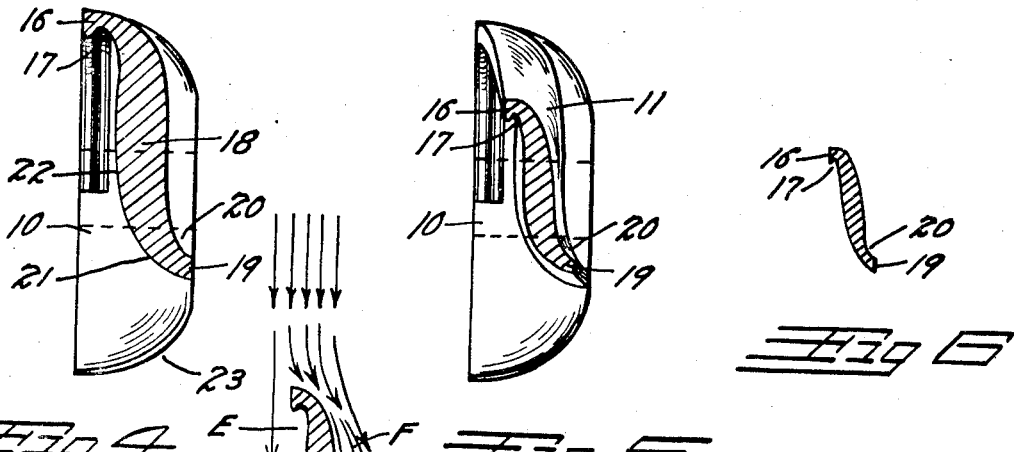
Inventor
WILLIAM H. LYMAN
By
Attorney

UNITED STATES PATENT OFFICE 1,977,072

AIRCRAFT PROPELLER

William H. Lyman, Denver, Colo., assignor to Grace Lyman, Denver, Colo.

Application October 31, 1933, Serial No. 696,014

8 Claims. (Cl. 170—159)

This invention relates to a propeller for aircraft and has for its principal object the provision of a propeller which will be more highly efficient than the present types of propellers.

In the usual type of propellers, the hub section is ineffective for driving or pulling purposes, in fact it creates a resistance to the passage of the craft through the air; therefore, not only does it fail to increase the effectiveness of the propeller, but detracts therefrom. Another object of the present invention is to provide a propeller in which the hub section thereof will increase the effectiveness and efficiency of the entire propeller.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a rear face view of the improved propeller.

Fig. 2 is a front view thereof.

Fig. 3 is an edge view thereof.

Fig. 4 is an enlarged cross section through the blade, taken on the line 4—4, Fig. 2.

Fig. 5 is a similar section, taken on the line 5—5, Fig. 2.

Fig. 6 is a blade section taken on the line 6—6, Fig. 2.

Fig. 7 is an airline diagram illustrating the action of the blades.

The propeller comprises a hub portion 10, from which blades 11 project and which contains the usual drive shaft opening 12. The leading edge of each blade 11 is designated on the drawing by the numeral 13, and the trailing edge by the numeral 14.

It is desired to call particular attention to the placement of the blades 11 upon the hub portion 10. Let us assume that a longitudinal center line is drawn through the axis of the shaft opening 12, and through the mid-point of each blade tip, as indicated by the broken line A—A, Fig. 2, and that a lateral center line is drawn through the axis at right angles to the line A, as indicated by the line B—B, Fig. 2. It will be noted that the leading edges 13 intersect the line A—A at a greater distance from the axis than the prolongations of the trailing edges 14 intersect this line. This construction offsets the leading edge of one blade from the trailing edge of the opposite. The offsets are connected by means of arcuate edges 15. The arcuate edges 15 are eccentric of the propeller axis and preferably have their axes positioned on the line B—B at each side of the propeller axis, as indicated by the radius center points, C.

Since the centers of the arcuate edges 15 are eccentric from the propeller center, these arcuate edges will be caused to act as prolongations of the leading edges 13 since they will also enter the air as the propeller rotates. Therefore a propelling effect is obtained entirely across the hub portion of the propeller. The trailing edges 14 are positioned substantially parallel to the center line A—A and a tapering effect on the blades is obtained from the incline of the leading edges 13.

The leading and trailing edges have a special airfoil or section as shown in Figs. 4, 5, and 6. The leading edge is comparatively blunt or rounded on its forward face and is provided with a flange-like bead 16 extending entirely along the edge 13 and around the arcuate edge 15. The bead 16 is preferably slightly undercut to form a vacuum groove 17 at its rear, from which the forward face of the blade swells slightly to form a relatively thick center section 18, thence swings rearwardly to form a trailing flange 19, in front of which is a longitudinal pressure concavity or groove 20.

The bead 16 and the flange 19 preferably increase in height as the hub section is approached and decrease in height toward the tip of the blades, as will be noted in Fig. 3 and by comparison of Figs. 4, 5, and 6.

Let us assume that the propeller of Fig. 2 is rotating in the direction of the arrow D. It will be noted that the line of flow of the air over the forward flange 16 will create a rarefied or vacuum area E on the front of the blade in the rear of the bead. This area will greatly assist the propelling action of the blade, not only by removing the air resistance from the front, but also by increasing the effectiveness of the atmospheric pressure on the rear face thereof.

As the air reaches the trailing edge, the front surface gradually swings rearwardly as indicated at 21 so as to allow the air to close along stream lines in the rear of the blade without producing a vacuum drag thereon. On the rear face of the blade, the blunt leading edge gradually swings into a slightly swelling surface 22 which acts to compress the air on the rear face of the blade as indicated at F, Fig. 7. This compression is increased as the air reaches the pressure groove 20 adjacent the trailing edge. We therefore have an ideal condition in a propeller. A rarefied or vacuum area on the front of the blades and a high pressure area on the rear thereof.

It is desired to call particular attention to the action of the rarefied area on the hub section 10. As the aircraft moves forwardly through the air it will tend to create a pressure zone in front of the hub area 10. It will be noted, however, that this area is directly open to the low pressure or vacuum areas on the blades so that these vacuum areas will draw upon and remove the air from in front of the hub section so as to keep a rarefied area about the hub and increase the drive efficiency of the propeller. This action is assisted by the entering action of the curved edges 15 which are also entering the air and forming vacuum areas in the rear of the bead 16 about the hub portion 10. The entering face of the arcuate portions 15 is rounded as shown at 23 in Fig. 4, so that as these arcuate portions enter the air they will create a pressure area in back of the hub portion 10 which also increases the effectiveness of the propeller.

In actual tests with this propeller compared with an ordinary propeller of similar size, it was found that the improved propeller created greater pull upon the shaft with less revolutions per minute. It was also found that the improved propeller required about 25% more power than the ordinary propeller, but that it delivered a greater air travel speed, therefore indicating much greater pull upon the shaft, and definitely showing the increased efficiency of the improved construction.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A propeller comprising: a hub portion; blades projecting oppositely outward from said hub portion, said blades being joined to said hub portion in offset relation so that the inner extremities of their leading edges will be spaced further from the axis of said propeller than the inner extremities of their trailing edges; and arcuate edges joining the leading edge of one blade with the trailing edge of the other blade, said arcuate edges being a continuation of said leading edges and of the same general cross sectional shape, said cross sectional shape being an upturned undercut flange.

2. A propeller comprising: a hub portion; blades projecting oppositely outward from said hub portion, said blades being joined to said hub portion in offset relation so that the inner extremities of their leading edges will be spaced further from the axis of said propeller than the inner extremities of their trailing edges; and arcuate edges joining the leading edge of one blade with the trailing edge of the other blade, the centers of curvature of said arcuate edges being eccentric of the axis of said propeller.

3. A propeller comprising: a hub portion; blades projecting oppositely outward from said hub portion, said blades being joined to said hub portion in offset relation so that the inner extremities of their leading edges will be spaced further from the axis of said propeller than the inner extremities of their trailing edges; and arcuate edges joining the leading edge of one blade with the trailing edge of the other blade, said arcuate edges intersecting said leading edges on a line at right angles to the longitudinal axial center line of said propeller.

4. A propeller comprising: a hub portion; blades projecting oppositely outward from said hub section; a bead formed along the leading edge of each blade on the front face thereof so as to create a vacuum area on said front face as said propeller rotates; and a rearwardly turned flange along the trailing edge on the rear face of each blade so as to create a pressure area on said rear face.

5. A propeller comprising: a hub portion; blades projecting oppositely outward from said hub section; a bead formed along the leading edge of each blade on the front face thereof so as to create a vacuum area on said front face as said propeller rotates, said bead extending inwardly beyond the axial lateral center line of said propeller.

6. A propeller comprising: a hub portion; blades projecting oppositely outward from said hub section; a bead formed along the leading edge of each blade on the front face thereof so as to create a vacuum area on said front face as said propeller rotates, said bead extending partially around the contour of said hub portion.

7. A blade for an aircraft propeller comprising: a blade section; a forwardly extending bead formed along the leading edge of said blade section; a concavity joining said bead to the front face of said blade section; and a blunt, rounded portion joining said bead to the rear face of said blade section.

8. A blade for an aircraft propeller comprising: a blade section; a forwardly extending bead formed along the leading edge of said blade section; a concavity joining said bead to the front face of said blade section; a blunt, rounded portion joining said bead to the rear face of said blade section; a rearwardly extending flange along the trailing edge of said blade section; a gradually curved area joining said flange to the front surface of said blade section; and a more abruptly curved area joining the rear of said flange with the rear of said blade section.

WILLIAM H. LYMAN.